July 7, 1925. 1,544,709

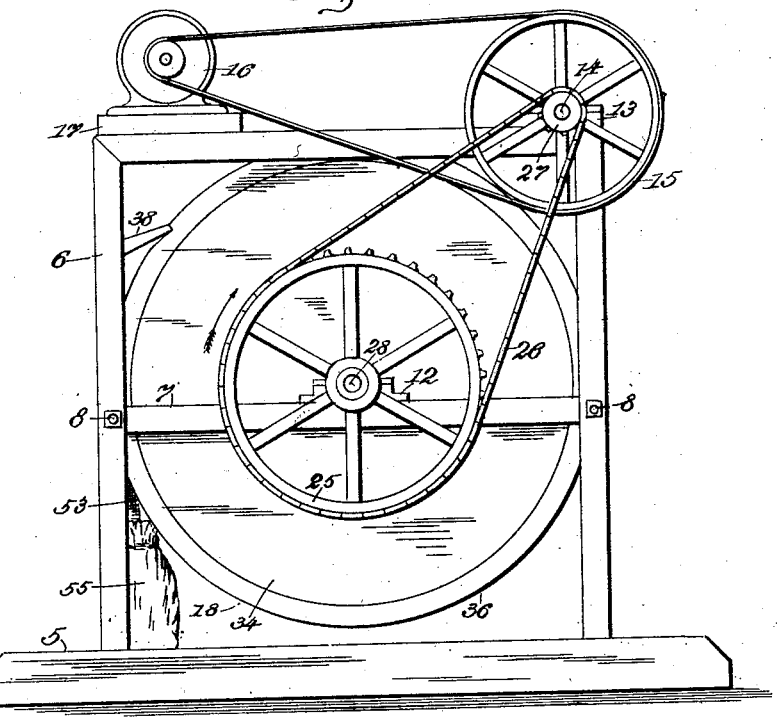
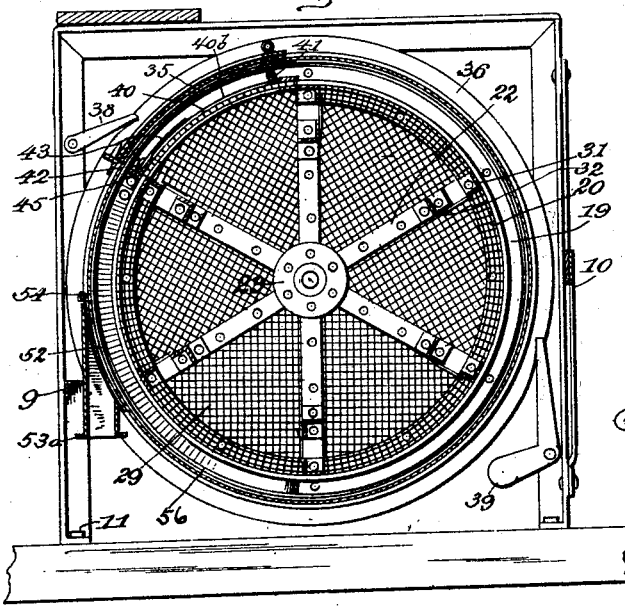

T. G. WHITE

BAG CLEANER AND SACKER

Original Filed March 24, 1921 2 Sheets-Sheet 2

Inventor
Thelo Glenn White
By J. M. St. John
Atty.

Patented July 7, 1925.

1,544,709

UNITED STATES PATENT OFFICE.

THELO GLENN WHITE, OF CEDAR RAPIDS, IOWA.

BAG CLEANER AND SACKER.

Application filed March 24, 1921, Serial No. 455,080. Renewed January 23, 1925.

*To all whom it may concern:*

Be it known that I, THELO GLENN WHITE, a citizen of the United States, residing at Cedar Rapids, in the county of Linn and State of Iowa, have invented certain new and useful Improvements in a Bag Cleaner and Sacker; and I do hereby declare the following to be a full, clear, and exact description of the invention, such as will enable others skilled in the art to which it appertains to make and use the same.

This invention relates to machines used for extracting dust and dirt from fabrics, and refers more particularly to machines for cleaning cement sacks after they have been emptied of all the cement that will naturally come out of them.

It will be understood that in the use of cement the sacks are emptied of as much of the material as will easily shake out and the empty sacks are then bundled and returned to the wholesale distributing house, and eventually to the factory, or directly to the cement factory. Unless the sacks are cleaned, a very considerable quantity of cement clings to them, resulting in a double loss to the user, this cement that might be saved, and the extra freight for carrying it back to the factory. The cleaning of such sacks is by no means new, but my invention provides improved apparatus for the purpose, designed to do the work thoroughly, cheaply, and with very little trouble, and at the same time to sack the recovered cement. It also provides for quickly and easily clearing the machine of one kind of material, so that it may be shifted and work on other material, such, for example, as plaster, stucco, or other sacked materials.

The invention is fully disclosed in the description and claims following, reference being had to the accompanying drawings, in which:—

Figure 3:
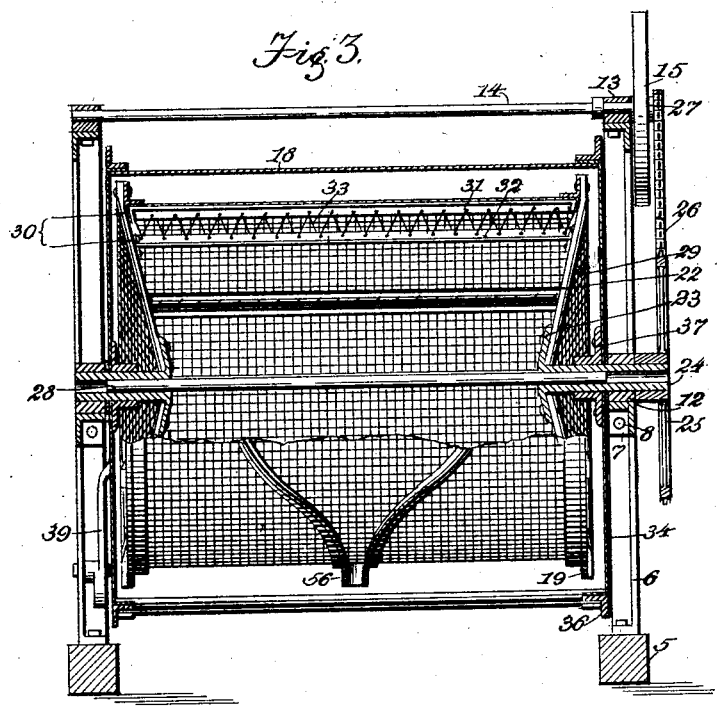
Figure 4:
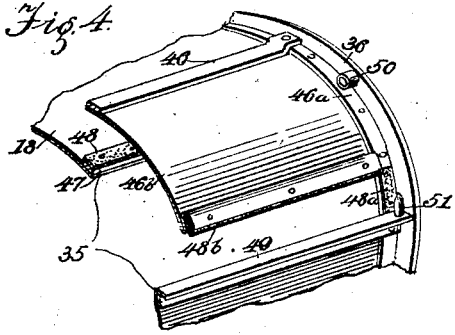
Figure 5:
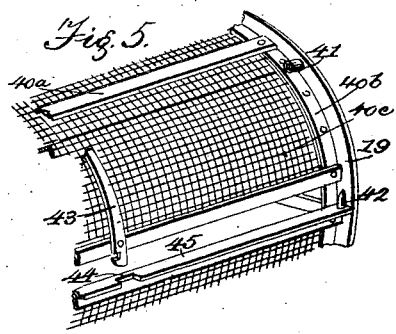
Figure 6:
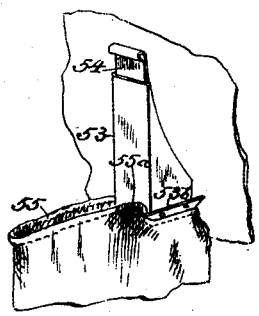

Fig. 1 is a side elevation of a machine embodying my invention. Fig. 2 is a mid-section of the same. Fig. 3 is a mid-section of the same at right angles to that shown in Fig. 2, excepting that a part of the inner drum is shown in full. Fig. 4 is a fragmentary view in perspective, showing the mounting of the outer door. Fig. 5 is a similar view, showing the mounting of the inner door. Fig. 6 is a perspective view showing the sack-filling spout, and the attachment of a sack thereto.

On suitable skids 5 is mounted the main supporting frame. This in practice is formed mainly of angle-steel, and has a pair of rectangular end-sections 6, connecting at about mid height by cross-beams 7, bolted thereto at 8. The end sections connect in front by a cross-beam 9, and at the rear by diagonal braces 10. The frame is shown bolted to the skids at 11. To the beams 7 are secured bearings 12, which carry the cleaning apparatus. Bearings 13 carry a jackshaft 14, provided with a pulley 15, to which power may be applied in any suitable manner, preferably by an electric motor 16 mounted on a plank 17 attached to the top of the frame.

The cleaning apparatus includes a tightly closable outer cylinder 18, to catch and hold the beaten-out material, and an inner tumbling-barrel or drum, the slow revolution of which lifts and drops the sacks, and so beats out the cement clinging to them. The latter may be first described. Two end-rings 19 connect with a cylindrical web of woven wire 20, as by riveting thereto. The web is discontinuous for a space wide enough for the insertion and removal of sacks, and this is normally closed by a door, which will be described more in detail hereafter. The end-rings connect with arms 22 extending radially from a hub or flange 23 of a gudgeon 24, for each head, the gudgeons being carried by the bearings 12. One of these is provided with a sprocket 25, connecting by a chain 26 with a small sprocket 27 on the jack-shaft. A central shaft 28 serves to hold the gudgeons in true alignment, and helps somewhat in the beating of the sacks, but is otherwise not very essential. To the radial arms are secured sections of woven wire 29. Referring to Fig. 3 it will be seen that the heads so formed are inwardly concaved. The purpose of this is to give additional scouring surface to the tumbling barrel, since some of the sacks, those nearest the ends, will fall on the inclined heads, and will be beaten and dusted to some extent thereby. The concaving of the heads also provides space for the internal hubs of the outer casing, as will appear presently.

The interior of the barrel is provided with a series of radial flights 30, which catch the sacks as the barrel revolves, carry them up on the ascending side, and drop them when the flights are near the top of their movement. It is by this dropping of the sacks that they are cleaned of cement and very thoroughly, the action even reducing to powder lumps that have formed in the sacks by wetting. In the construction of the flights it is desirable that lifted cement may sift through them, and they are accordingly given a reticulated structure. As herein shown, the flights are composed of a pair each of cross-bars 31 and 32, connecting with the radial arms of the heads. One of the bars is placed close to the cylindrical web, and the other at a suitable distance therefrom, and through holes in each a lacing of wire 33 is run, as shown in Fig. 3.

The outer casing is preferably of sheet steel, a little larger than the extreme diameter of the barrel, and also a little longer. It also has a gap 35 for the insertion and removal of sacks. The cylinder is capped by a pair of sheet-metal heads 34, and the heads are reinforced by an enclosing ring 36. Inside the heads are attached central flanges 37, which serve to support the casing revolubly on the gudgeons above described. The casing is held immovably by a pair of oppositely disposed dogs 38 and 39 engaging notches in the ring. This pivotal mounting of the outer casing permits it to be turned so that the gap is at the bottom, and any cement in the casing is dumped thereby. This is easily done by simply disengaging the dog 38 and turning the front of the casing downwardly. A reverse movement, with the dog dropped, will restore the casing to normal position and automatically lock it. This at times is a matter of great convenience, as the operator may wish to shift from cement sacks to plaster or stucco sacks, and back again, and in either case the machine should be free of the other material.

The opening in the sifting barrel is closed normally by a door 40. This consists essentially of a pair of side-bars 40$^a$, curved end-bars 40$^b$ and a connecting web 40$^c$ of woven wire. The door is mounted to slide on the inwardly projecting flanges of the cylinder rings, and is held in place by rollers 41 and corner-retaining lugs 42. A latch-lever 43 locks the door securely in place by engagement with a notch 44 in the cross-bar 45 at the bottom of the gap in the barrel.

The construction and mounting of the door for the casing are similar, in the main. The door may have but one cross-bar 46, however, with a pair of curved end-bars 46$^a$, and a connected sheet-metal body 46$^b$. This door should fit the casing very nicely, however, as one of the important objects of this invention is to prevent the scattering of dust, detrimental to the surroundings, and wasteful of material. The four sides of the door are accordingly made dust-proof. On one side is a stiffener-bar 47 and to this is attached a strip of suitable yielding material, such as felt, 48. Similar strips 48$^a$ are laid on the flanges of the end rings. The other side of the door is best sealed by a strip 48$^b$ inserted in a groove formed by a reverse fold of the edge of the door, as it is here less exposed to wear or displacement than if placed as a facing strip on top of the abutting cross-bar 49. The door is held in place by a roller 50 and retaining lug 51, the door closing under the rollers and lugs with a pinching action tending to press the door tightly on the interposed packing material.

Over a front opening in the casing, 52, is attached a depending spout 53, provided with a closing gate 54. The bottom end of the spout is outwardly flanged at 53$^a$, and a little above the flange is attached a double-ended spur 53$^b$. A sack 55 is easily and quickly attached by bringing the mouth of the sack over the flange, taking a short back-fold in the sack at 55$^a$ over the adjacent end of the spur, and then carrying the remaining folded throat of the sack back and fastening on the other end of the spur.

The material collecting at the bottom of the casing is carried to this spout by a scraper or scoop 56. This is here shown as a V-shaped rib following the curvature of the barrel, its ends attached to the end-rings of the barrel, and its constricted portion coinciding lengthwise with the position of the spout. The outer edges of the rib should run quite closely to the casing, so as to move forward the most of the material therein. This as forwarded by the scraper is dumped into the spout, and falls thence into the depending sack. The operator thus has only to throw a suitable number of sacks into the barrel, close the doors, attach a sack to the spout, and throw on the power. When the tumbling has continued long enough he opens the doors, which occupy no extra room when open, removes the cleaned sacks, tying up the storage sack when filled, and repeats the operation. In the interval of tumbling his attention may be wholly given to other matters.

Referring to Fig. 3 it will be seen that a washer of packing material is placed between the head of the outer casing and the adjacent bearing. In applying the packing the ends of the casing are forced inwardly somewhat, with the result that the outward spring of the heads keeps the joint dust-proof, and automatically takes up any wear on the packing washer.

Having thus described my invention, I claim:

1. In a sack-cleaner, an outer casing semi-cylindrical at the bottom, an outlet therefrom, and an internal sifting barrel provided with a peripheral scraper with spirally disposed, flaring sides converging where the barrel passes said outlet.

2. In a sack-cleaner, an outer casing having a semi-cylindrical bottom, an outlet in a side thereof, a depending spout therefrom, and an internal sifting barrel provided with a peripheral scraper to gather the deposit and deliver it to said spout, and means for attaching a sack to said spout.

3. In a sack-cleaner, a cylindrical sifting barrel having laterally and circumferentially flanged end-rings, a curved door adapted to slide on the lateral flanges, door-retaining rollers attached to the circumferential flanges, and a latch to lock the door in closed position.

4. A sack-cleaner having a cylindrical outer casing, provided with circumferentially and laterally flanged end-rings, and with a side opening outwardly flanged at the bottom, a curved door slidable on the lateral flanges, retaining rollers therefor attached to the circumferential flanges, a yieldable packing strip to close the space between the upper edge of the door and the adjacent cylinder, and a similar packing strip attached to the lower edge of the door, to abut tightly against the outward flange of the cylinder opening.

In testimony whereof I affix my signature in presence of two witnesses.

THELO GLENN WHITE.

Witnesses:
F. W. ARMSTRONG,
G. C. ELLWOOD.